United States Patent [19]

Inoue

[11] Patent Number: 5,049,635

[45] Date of Patent: Sep. 17, 1991

[54] ROOM TEMPERATURE-CURABLE ORGANOPOLYSILOXANE COMPOSITION

[75] Inventor: Yoshio Inoue, Annaka, Japan

[73] Assignee: Shin-Etsu Chemical Co., Ltd., Tokyo, Japan

[21] Appl. No.: 467,385

[22] Filed: Jan. 19, 1990

[30] Foreign Application Priority Data

Jan. 27, 1989 [JP] Japan .................................. 1-18332

[51] Int. Cl.$^5$ .............................................. C08G 77/06
[52] U.S. Cl. ........................................ 528/18; 528/32; 528/33; 528/34; 528/901; 528/38
[58] Field of Search ...................... 528/18, 901, 32, 33, 528/34, 38

[56] References Cited

U.S. PATENT DOCUMENTS 4,720,531  1/1988  Chung et al. ........................... 528/18
4,734,479  3/1988  Inoue et al. ........................... 528/901
4,788,254  11/1988  Kawakubo et al. .................... 528/18

*Primary Examiner*—Melvyn I. Marquis
*Attorney, Agent, or Firm*—Wyatt, Gerber, Burke and Badie

[57] ABSTRACT

A room temperature-curable organopolysiloxane composition is proposed which is capable of giving a cured silicone rubber having a low elastic modulus and low hardness. The composition comprises, in addition to a silanol-terminated diorganopolysiloxane as the base component (a), (b) an organosilicon compound represented by the general formula $R^1R^2Si(-OCMe=CH-COOR^3)_2$, in which Me is a methyl group, $R^1$ is a methyl, vinyl, 3,3,3-trifluoropropyl or phenyl group, $R^2$ is a group selected from the class consisting of methyl, vinyl, trimethyl siloxy, vinyl dimethyl siloxy, divinyl methyl siloxy, trivinyl siloxy and 3,3,3-trifluoropropyl dimethyl siloxy groups and $R^3$ is a methyl or ethyl group, (c) an organosilane or organosiloxane compound having, in a molecule, at least three groups selected from the class consisting of alkoxy groups, iminoxy groups and alkenyloxy groups bonded to the silicon atom or atoms, and (d) an organosilane or organosiloxane compound having, in a molecule, at least one guanidino group represented by the general formula $(R^4{}_2N)_2C=N-$, in which $R^4$ is a hydrogen atom or a monovalent hydrocarbon group.

7 Claims, No Drawings

ROOM TEMPERATURE-CURABLE ORGANOPOLYSILOXANE COMPOSITION

BACKGROUND OF THE INVENTION

The present invention relates to a room temperature-curable organopolysiloxane composition or, more particularly, to a room temperature-curable organopolysiloxane composition capable of giving a cured elastomer having a low elastic modulus, which can be stored with stability under a hermetically sealed condition.

Various types of room temperature-curable organopolysiloxane compositions, referred to as RTV compositions hereinbelow, capable of giving a low-modulus elastomer by curing are known in the prior art, in which the organopolysiloxane component has aminoxy groups to serve as a crosslinking agent. For example, Japanese Patent Publication No. 42-24545 teaches a RTV composition comprising a silanolic hydroxy-terminated diorganopolysiloxane as the principal ingredient, a difunctional aminoxysilane and a trifunctional aminoxysilane. A problem in such a RTV composition is that the composition as a commercial product cannot be formulated in the form of a one package preparation because the composition is unstable even under a hermetically sealed condition. It is usual that the composition is prepared in the form of a two-package preparation and the contents of the separate packages are blended together directly before use to cause some inconveniences in respect of the workability therewith.

Japanese Patent Publication No. 52-30020 proposes an improvement of the above described RTV composition by replacing the difunctional and trifunctional aminoxysiloxanes with a difunctional amidosilane and trifunctional aminoxysiloxane, respectively. The RTV composition of this type is also accompanied by the disadvantages that a high boiling-point amide compound is produced as a by-product of the curing reaction to greatly decrease the adhesive bonding strength of the cured rubber composition to the substrate surface in addition to the still insufficient storage stability as a consequence of the formulation with an aminoxysilane as the trifunctional component. Furthermore, such a composition has been required to be improved to solve the problem that the undercoating layer on the substrate is subject to the attack of the RTV composition or the surface or a metallic substrate is subject to corrosion.

SUMMARY OF THE INVENTION

The present invention accordingly has an object to provide a room temperature-curable organopolysiloxane composition capable of giving a cured rubbery elastomer having a low elastic modulus and having excellent storage stability under a sealed condition without the above mentioned disadvantages and problems in the prior art RTV compositions.

The RTV composition of the present invention comprises, in admixture:

(a) 100 parts by weight of a diorganopolysiloxane blocked at each molecular chain end with a silanolic hydroxy group;

(b) from 0.5 to 10 parts by weight of an organosilicon compound, i.e. organosilane or disiloxane compound, represented by the general formula

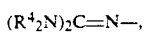
$$R^1R^2Si(-OCMe=CHCOOR^3)_2, \quad (I)$$

in which Me is a methyl group, $R^1$ is a methyl, vinyl, 3,3,3-trifluoropropyl or phenyl group, $R^2$ is a methyl, vinyl, trimethyl siloxy, vinyl dimethyl siloxy, divinyl methyl siloxy, trivinyl siloxy or 3,3,3-trifluoropropyl dimethyl siloxy group and $R^3$ is a methyl or ethyl group;

(c) from 0.1 to 5 parts by weight of an organosilane or organosiloxane compound having, in a molecule, at least three groups selected from the class consisting of alkoxy groups, iminoxy groups and alkenyloxy groups bonded to the silicon atom or atoms; and (d) from 0.05 to 5 parts by weight of an organosilane or organosiloxane compound having, in a molecule, at least one guanidino group represented by the general formula

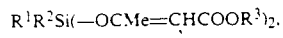
$$(R^4{}_2N)_2C=N-,$$

in which $R^1$ is a hydrogen atom or a monovalent hydrocarbon group.

The composition should preferably further comprise an organic tin compound as a catalyst for the condensation reaction when the organosilane or organosiloxane compound as the component (c) has an alkoxy or iminoxy group.

DETAILED DESCRIPTION OF THE PREFERRED EMBODIMENTS

The inventor has completed the present invention as a result of the extensive studies undertaken to overcome the above described disadvantages in the prior art. Namely, the inventor has discovered that a RTV composition storable in one package can be obtained by the synergistic effect of a molecular chain extender and a crosslinking agent which catalytically react with the silanol-terminated diorganopolysiloxane of a relatively low molecular weight as the principal component in the composition. The rubbery elastomer obtained from such an organopolysiloxane composition may have a low elastic modulus.

The inventive RTV composition comprises, in admixture:

(a) 100 parts by weight of a diorganopolysiloxane blocked at each molecular chain end with a silanolic hydroxy group;

(b) from 0.5 to 10 parts by weight of an organosilicon compound represented by the general formula (1);

(c) from 0.1 to 5 parts by weight of an organosilane or organosiloxane compound having, in a molecule, at least three groups selected from the class consisting of alkoxy groups, iminoxy groups and alkenyloxy groups bonded to the silicon atom or atoms; and (d) from 0.05 to 5 Parts by weight of an organosilane or organosiloxane compound having, in a molecule, at least one guanidino group of the general formula $(R^4{}_2N)_2C=N-$, in which $R^4$ is a hydrogen atom or a monovalent hydrocarbon group.

The diorganopolysiloxane blocked at each molecular chain end with a silanolic hydroxy group as the component (a) in the inventive composition is a conventional material known as the principal ingredient in RTV compositions. The organic groups bonded to the silicon atoms are selected from the class consisting of alkyl groups such as methyl, ethyl and propyl groups, alkenyl groups such as vinyl and allyl groups, aryl groups such as phenyl group and those substituted groups obtained by replacing a part or all of the hydrogen atoms in the above named hydrocarbon groups with substituents such as halogen atoms. The diorganopolysiloxane as the component (a) should preferably have such an average degree of polymerization that the diorganopolysiloxane may have a viscosity in the range from 100 to 1,000,000 centistokes or, more preferably, from 3,000 to 20,000 centistokes at 25 °C. since cured rubbery elastomers having good mechanical strengths cannot be obtained when the viscosity of the diorganopolysiloxane is too low while, when the viscosity of the diorganopolysiloxane is too high, on the other hand, the inventive RTV composition has decreased workability.

The component (b), which is an organosilicon compound of the general formula (1), i.e. an organosilane or disiloxane compound, is an essential component which serves as a molecular chain extender in the curing process by the reaction with the above mentioned component (a) to give a linear-chain diorganopolysiloxane having an increased molecular weight. Particular examples of the component (b) include, for example, those expressed by the following formulas: Me$_2$Si(OCMe=CHCOOMe)$_2$; MeViSi(OCMe=CHCOOMe)$_2$; (CF$_3$C$_2$H$_4$)MeSi(OCMe=CHCOOMe)$_2$; Me(SiMe$_3$O)Si(OCMe=CHCOOMe)$_2$; Vi(SiMe$_3$)Si(OCMe=CHCOOMe)$_2$; Ph(SiMe$_3$O)Si(OCMe=CHCOOMe)$_2$; (CF$_3$C$_2$H$_4$)(SiMe$_3$O)Si(OCMe=CHCOOMe)$_2$; Me[(CF$_3$C$_2$H$_4$)Me$_2$SiO]Si(OCMe=CHCOOMe)$_2$, Vi[(CF$_3$C$_2$H$_4$)Me$_2$SiO]Si(OCMe=CHCOOMe)$_2$; (CF$_3$C$_2$H$_4$)[(CF$_3$C$_2$H$_4$)Me$_2$SiO]Si(OCMe=CHCOOMe)$_2$; Me(Me$_2$ViSiO)Si(OCMe=CHCOOMe)$_2$, ViSi(OSiMe$_2$Vi)(OCMe=CHCOOMe)$_2$, (CF$_3$C$_2$H$_4$)(Me$_2$ViSiO)Si(OCMe=CHCOOMe)$_2$; Ph(Me$_2$ViSiO)Si(OCMe=CHCOOMe)$_2$; Me(Me$_2$ViSiO)Si(OCMe=CHCOOMe)$_2$; Me(Vi$_3$SiO)Si(OCMe=CHCOOMe)$_2$; Vi(Vi$_3$SiO)Si(OCMe=CHCOOMe)$_2$; (CF$_3$C$_2$H$_4$)(Vi$_3$SiO)Si(OCMe=CHCOOMe)$_2$ and the like. Those compounds obtained by substituting a group of the formula —OCMe=CHCOOEt for the —OCMe=CHCOOMe group in the above given formulas are also suitable as the component (b). The symbols Me, Et, Vi and Ph in these formulas and hereinafter are a methyl, ethyl, vinyl and phenyl groups, respectively.

The organosilicon compound as the component (b) should preferably be used in an amount in the range from 0.5 to 10 parts by weight or, more preferably, from 1 to 3 parts by weight per 100 parts by weight of the component (a). No cured rubbery elastomer having a low elastic modulus would be obtained due to the insufficient formation of a linear diorganopolysiloxane having an increased molecular weight by chain extension when the amount of the component (b) is too small. When the amount thereof is too large, on the other hand, the curing process would take an unduly long time due to the decrease in the curing velocity resulting in the loss of practical usefulness and economical value despite the low elastic modulus of the cured elastomer.

The organosilane or organosiloxane compound as the component (c) serves as a crosslinking agent to form crosslinks at room temperature to give a cured rubbery elastomer having a low elastic modulus. The component (c) should have at least three groups selected from alkoxy groups, iminoxy groups, i.e. ketoxime residues such as dimethyl ketoxime group, diethyl ketoxime group, methyl ethyl ketoxime group, cyclopentanoxime group, cyclohexanoxime group and the like, and alkenyloxy groups, i.e. isopropenyloxy group, isobutenyloxy group and the like, in a molecule.

Examples of the organosilane compound as the component (c) include those represented by the general formula $$R^5{}_m SiX_{4-m} \quad (II)$$

in which $R^5$ is selected from methyl, ethyl, propyl, vinyl, phenyl and 3,3,3-trifluoropropyl groups, X is selected from alkoxy groups, iminoxy groups and alkenyloxy groups and m is 0 or 1. Partial hydrolysis products of these organosilane compounds can also be used as the component (c).

Examples of the organosiloxane compounds as the component (c) include those represented by the average unit formula $$R^6{}_a X_b SiO_{(4-a-b)/2} \quad (III)$$

in which $R^6$ is, each independently from the others, a group selected from methyl, ethyl, propyl, vinyl, phenyl and 3,3,3-trifluoropropyl groups, X is a group selected from alkoxy groups, iminoxy groups and alkenyloxy groups, a is a positive number not smaller than 1 but smaller than 2 and b is a positive number not exceeding 1 with the proviso that a+b is a positive number in the range from 1 to 2.

Particular examples of the organosilane compound represented by the general formula (II) as the component (c) include those expressed by the following formulas: Si(OMe)$_4$, Si(OEt)$_4$, Si(OPr)$_4$, MeSi(OMe)$_3$, ViSi(OMe)$_3$, CF$_3$C$_2$H$_4$Si(OMe)$_3$, PhSi(OMe)$_3$, MeSi(ON=CMe$_2$)$_3$, MeSi(ON=CMeEt)$_3$, ViSi(ON=CMe$_2$)$_3$, ViSi(ON=CMeEt)$_3$, PrSi(ON=CMe$_2$)$_3$, EtSi(ON=CMeEt)$_3$, PhSi(ON=CMeEt)$_3$,

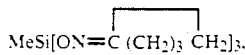

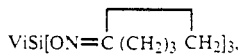

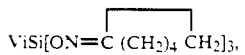

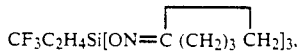

CF$_3$C$_2$H$_4$Si(ON=CMeEt)$_3$, MeSi(OCMe=CH$_2$)$_3$, ViSi(OCMe=CH$_2$)$_3$, PhSi(OCMe=CH$_2$)$_3$, ViSi(OCEt=CH$_2$)$_3$ and CF$_3$C$_2$H$_4$Si(OCMe=CH$_2$)$_3$. Partial hydrolysis products of these silane compounds can also be used as the component (c).

Particular examples of the organosiloxane compound represented by the average unit formula (III) as the component (c) include those expressed by the following formulas:

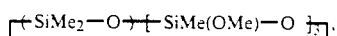

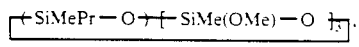

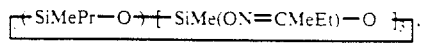

-continued

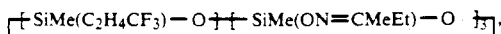

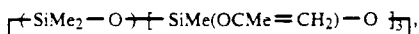

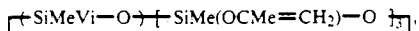

Me₃SiO−⟨SiMe₂−O⟩ₓ−⟨SiMe(OMe)−O⟩ᵧSiMe₃,

Me₃SiO−⟨SiMe₂−O⟩ₓ−⟨SiMe(ON═CMeEt)−O⟩ᵧSiMe₃, and

Me₃SiO−⟨SiMe(OCMe═CH₂)−O⟩ᵧSiMe₃.

In these formulas and hereinafter, the symbol Pr denotes a propyl group.

These organosilane or siloxane compounds as the component (c) serve as a crosslinking agent in the curing process to give an elastomer having a low elastic modulus. These compounds should be used preferably in an amount in the range from 0.1 to 5 parts by weight or, more preferably, from 0.2 to 2 parts by weight per 100 parts by weight of the component (a). No rubbery elastomer could be obtained when the amount thereof is too small. When the amount thereof is too large, on the other hand, the elastomer obtained by curing the composition would have an unduly high elastic modulus not to meet the object of the invention to give an elastomer having a low elastic modulus.

The silane or siloxane compound containing at least one guanidino group of the formula $$(R^{4}{}_{2}N)_{2}C═N—$$

In a molecule as the component (d) serves as an effective catalyst in the process to form a diorganopolysiloxane having a high molecular weight by the molecular chain extension of the component (a) by the reaction with the component (b). Particular examples of the component (d) include those compounds expressed by the following formulas: (Me₂N)₂C═NC₃H₆Si(OMe)₃, (Me₂N)₂C═NC₃H₆SiMe(OMe)₂, (Me₂N)₂C═NC₃H₆SiMe₂(OMe), (Me₂N)₂C═NC₃H₆SiMe₃, (Me₂N)₂C═NC₃H₆Si(OSiMe₃)₃, (Me₂N)₂C═NC₃H₆SiMe-SiO]₄, Me₃SiO−(SiMe₂−O)₁₀−(SiMe[C₃H₆N═C-(NMe₂)₂]−O)₁₀SiMe₃, HO−(SiMe₂−O)₁₀Si-Me[C₃H₆N═C(NMe₂)₂]−O)₁₀H.

When the organosilane or siloxane compound as the component (c) in the inventive composition has an alkoxy or iminoxy group bonded to the silicon atom thereof but no alkenyloxy groups, further addition of an organic tin compound to the composition is preferred to catalytically promote the condensation reaction. Examples of such organic tin compounds include carboxylic acid salts of tin, such as tin naphthenate, tin caprylate, tin oleate and the like, dibutyl tin diacetate, dibutyl tin dioctoate, dibutyl tin dilaurate, dibutyl tin dioleate, diphenyl tin diacetate, dibutyl tin oxide, dibutyl tin dimethoxide, dibutyl bis(triethoxysiloxy) tin, dibutyl tin dibenzylmaleate and the like. Such an organic tin compound should preferably be added to the composition in an amount in the range from 0.01 to 10 parts by weight or, more preferably, from 0.1 to 2 parts by weight per 100 parts by weight of the component (a) since, when the amount thereof is too small, the catalytic activity to be exhibited thereby would be too low to cause a delay in the curing reaction and eventually incomplete curing of the composition especially in the core portion of a thick body and, on the other hand, the storage stability of the composition would be low when the amount thereof is too large.

The inventive organopolysiloxane composition may further be admixed with a filler according to need with an object of reinforcing or extending. The filler used here is selected from those conventionally used in the art of silicone rubbers including siliceous ones such as finely divided quartz powder, finely pulverized fused silica glass, silica aerogel, precipitated silica and diatomaceous earth, metal oxides such as iron oxides, zinc oxide and titanium dioxide, optionally, rendered hydrophobic by the surface treatment using an organosilane compound, metal carbonates such as calcium carbonate, magnesium carbonate and zinc carbonate, asbestos, glass wool, carbon black, mica powder and powders of synthetic resins such as polystyrene, polyvinyl chloride and polypropylene, and so on.

Furthermore, the inventive composition thus obtained may be admixed with various kinds of known additives according to need. Such optional additives include, for example, thixotropy-imparting agents such as polyethylene glycol and derivatives thereof, pigments, dyes, aging retarders, antioxidants, antistatic agents, flame retardants such as antimony oxide and chlorinated paraffins, thermal conductivity improvers such as boron nitride and aluminum oxide, and others. Other optional additives added to the inventive composition according to need include adhesion improvers, so-called carbon-functional organosilanes such as those having an amino, epoxy or thiol group in the molecule, metal salts of carboxylic acid, metal alcoholates and the like. If desired, the inventive composition can be diluted by the addition of a suitable organic solvent such as hydrocarbon solvents, e.g., toluene and petroleum, ketones, esters and the like.

In the following, the inventive organopolysiloxane composition is described in further detail by way of examples.

EXAMPLES

A base compound was prepared by admixing and thoroughly blending 100 parts by weight of precipitated calcium carbonate having an average particle diameter of 0.8 μm after a surface treatment with a fatty acid with 100 parts by weight of a dimethylpolysiloxane blocked at each molecular chain end with a silanolic hydroxy group and having a viscosity of 5000 centistokes at 25° C. as the component (a).

Six RTV compositions according to the invention, referred to as the compositions I to VI hereinafter, were prepared by compounding, in a moisture-free atmosphere, 100 parts by weight of the above prepared base compound with different kinds of the other essential and optional ingredients each in an amount in parts by weight shown in the table given below. The additives were as specified below.

Component (b)
 B-I: MeViSi(OCMe═CHCOOEt)₂
 B-II: Me₂Si(OCMe═CHCOOMe)₂
 B-III: (CF₃C₂H₄)MeSi(OCMe═CHCOOEt)₂
 B-IV: ViSi(OSiMe₃)(OCMe═CHCOOMe)₂

Component (c)
 C-I: ViSi(OMe)₃
 C-II: MeSi(ON═CMeEt)₃
 C-III: MeSi(OCMe═CH₂)₃

C-IV: 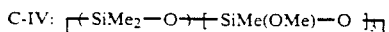

Component (d)
  D-I: 3-(tetramethylguanidino)propyl trimethoxy silane
  D-II: 3-(tetramethylguanidino)propyl tris(trimethylsiloxy) silane
Organic tin compound
  E-I: dibutyl tin dioctoate
  E-II: dibutyl tin dimethoxide Each of the compositions I to VI was shaped by extrusion molding into a sheet of 2 mm thickness which was kept standing in an atmosphere of 55% relative humidity at 25° C. to determine the time in minutes taken until the surface of the sheet was free from tackiness to give the results shown in the table. The sheets were further kept standing in the same atmosphere for 168 hours to be converted into a cured rubber sheets, of which mechanical properties were measured according to the procedure specified in JIS K 6301 to give the results shown in the table.

For comparison, a further composition, referred to as the composition VII hereinbelow, was prepared in the same manner as above except that the amount of the component (c) was increased to 8 parts by weight. The results of testing are shown also in the table, from which it is understood that the tack-free time was too short possibly to cause some inconvenience in handling in addition to the unduly high hardness and 150% modulus and too small ultimate elongation.

TABLE

| | Composition | | | | | | |
|---|---|---|---|---|---|---|---|
| | I | II | III | IV | V | VI | VII |
| Component (b) (parts) | B-I (4) | B-II (3.5) | B-III (3) | B-IV (3) | B-I (3.5) | B-I (4) | B-I (3) |
| Component (c) (parts) | C-I (0.3) | C-II (1) | C-III (0.5) | C-IV (0.8) | C-II (0.7) | C-II (1) | C-IV (8) |
| Component (d) (parts) | D-II (0.5) | D-II (0.5) | D-I (0.3) | D-I (0.3) | D-II (0.5) | D-II (0.5) | D-I (0.5) |
| Organic tin compound (parts) | E-I (0.2) | E-I (0.1) | — | E-II (0.1) | E-I (0.2) | E-II (0.1) | E-I (0.2) |
| Tack-free time, minutes | 45 | 30 | 15 | 60 | 35 | 20 | 8 |
| Hardness, JIS A | 15 | 13 | 16 | 15 | 12 | 16 | 48 |
| Ultimate elongation, % | 1000 | 900 | 800 | 850 | 1000 | 750 | 340 |
| Tensile strength, kg/cm² | 10 | 10 | 11 | 13 | 12 | 15 | 27 |
| 150% Elastic modulus, kg/cm² | 2.3 | 2.4 | 2.5 | 2.0 | 1.8 | 2.7 | 13.6 |

What is claimed is:
1. A room temperature-curable organopolysiloxane composition which comprises, in admixture:
   (a) 100 parts by weight of a diorganopolysiloxane blocked at each molecular chain end with a silanolic hydroxy group;
   (b) from 0.5 to 10 parts by weight of an organosilicon compound represented by the general formula

$R^1R^2Si(-OCMe=CHCOOR^3)_2$, in which Me is a methyl group, $R^1$ is a methyl, vinyl, 3,3,3-trifluoropropyl or phenyl group, $R^2$ is a group selected from the class consisting of methyl, vinyl, trimethyl siloxy, vinyl dimethyl siloxy, divinyl methyl siloxy, trivinyl siloxy and 3,3,3-trifluoropropyl dimethyl siloxy groups and $R^3$ is a methyl or ethyl group;
   (c) from 0.1 to 5 parts by weight of an organosilane or organosiloxane compound having, in a molecule, at least three groups selected from the class consisting of alkoxy groups, iminoxy groups and alkenyloxy groups bonded to the silicon atom or atoms; and
   (d) from 0.05 to 5 parts by weight of an organosilane or organosiloxane compound having, in a molecule, at least one guanidino group represented by the general formula $(R^4_2N)_2C=N-$, in which $R^4$ is a hydrogen atom or a monovalent hydrocarbon group.

2. The room temperature-curable organopolysiloxane composition as claimed in claim 1 which further comprises an organic tin compound in an amount in the range from 0.01 to 10 parts by weight per 100 parts by weight of the component (a).

3. The room temperature-curable organopolysiloxane composition as claimed in claim 1 wherein the diorganopolysiloxane as the component (a) is a dimethylpolysiloxane.

4. The room temperature-curable organopolysiloxane composition as claimed in claim 1 wherein the diorganopolysiloxane as the component (a) has a viscosity in the range from 100 to 1,000,000 centistokes at 25° C.

5. The room temperature-curable organopolysiloxane composition as claimed in claim 1 wherein the iminoxy group in the component (c) is a ketoxime residue selected from the class consisting of dimethyl ketoxime group, diethyl ketoxime group, methyl ethyl ketoxime group, cyclopentanoxime group and cyclohexanoxime group.

6. The room temperature-curable organopolysiloxane composition as claimed in claim 1 wherein the alkenyloxy group in the component (c) is an isopropenyloxy group or isobutenyloxy group.

7. A silicone rubber article obtained by curing the room temperature-curable organopolysiloxane composition according to claim 1.

* * * * *